(12) United States Patent
Babbitt et al.

(10) Patent No.: US 9,095,888 B2
(45) Date of Patent: Aug. 4, 2015

(54) CAN PROCESSING MACHINE WITH CANTILEVER DESIGN

(71) Applicant: Belvac Production Machinery, Inc., Lynchburg, VA (US)

(72) Inventors: Terry Babbitt, Lynchburg, VA (US); Harold James Marshall, Forest, VA (US); Joseph Schill, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 166 days.

(21) Appl. No.: 13/764,835

(22) Filed: Feb. 12, 2013

(65) Prior Publication Data

US 2013/0149073 A1 Jun. 13, 2013

Related U.S. Application Data

(62) Division of application No. 12/711,891, filed on Feb. 24, 2010, now Pat. No. 8,733,146.

(60) Provisional application No. 61/202,427, filed on Feb. 26, 2009.

(51) Int. Cl.
*B21D 51/26* (2006.01)
*B21D 21/00* (2006.01)
(Continued)

(52) U.S. Cl.
CPC .............. *B21D 21/00* (2013.01); *B21D 51/26* (2013.01); *B21D 51/2615* (2013.01); *B21D 51/2638* (2013.01); *B21D 51/2692* (2013.01); *B23Q 3/061* (2013.01); *B23Q 7/02* (2013.01);
(Continued)

(58) Field of Classification Search
CPC .............. B21D 51/26; B21D 51/2615; B21D 51/2638; B21D 51/2692
USPC .................................. 72/94, 404, 405.03, 426
See application file for complete search history.

(56) References Cited

U.S. PATENT DOCUMENTS

| 1,673,236 A | 6/1928 | Fleisher |
| 3,378,285 A | 4/1966 | Staley |

(Continued)

FOREIGN PATENT DOCUMENTS

| DE | 37 05 878 | 9/1987 |
| DE | 39 08 394 | 12/1989 |

(Continued)

OTHER PUBLICATIONS

American National Can: Invoice to Hanil Can Co; Ltd dated Feb. 2, 1998; 1 page.

(Continued)

*Primary Examiner* — Teresa M Ekiert
(74) *Attorney, Agent, or Firm* — Nixon Peabody LLP

(57) ABSTRACT

A machine arrangement that operates on a plurality of articles includes a plurality of machines arranged to cooperate with each other in a manner to form a machine arrangement. Each machine includes a modular base, a transfer star wheel, and a turret mechanism configured to perform a working operation on an article. The turret mechanism includes a turret star wheel. A central axis of the transfer star wheel is approximately 45 degrees below horizontal relative to a central axis of the turret star wheel. The turret mechanism includes a cantilevered portion overhanging a portion of the base.

18 Claims, 16 Drawing Sheets

(51) Int. Cl.
*B23Q 3/06* (2006.01)
*B23Q 7/02* (2006.01)
*B23Q 39/02* (2006.01)
*B23Q 39/04* (2006.01)
*F16K 3/02* (2006.01)

(52) U.S. Cl.
CPC ............ *B23Q39/028* (2013.01); *B23Q 39/044* (2013.01); *F16K 3/0218* (2013.01); *F16K 3/0236* (2013.01); *Y10T 29/519* (2015.01); *Y10T 29/5152* (2015.01); *Y10T 29/5165* (2015.01); *Y10T 279/1041* (2015.01); *Y10T 279/32* (2015.01); *Y10T 403/7024* (2015.01); *Y10T 403/7051* (2015.01)

(56) References Cited

U.S. PATENT DOCUMENTS

| | | | |
|---|---|---|---|
| 3,418,837 A | | 12/1968 | Vanerlaan et al. |
| 3,581,542 A | | 6/1971 | Wahler et al. |
| 3,797,429 A | | 3/1974 | Wolfe |
| 3,913,366 A | * | 10/1975 | Nelsen et al. ............... 72/94 |
| 3,983,729 A | | 10/1976 | Traczyke et al. |
| 4,278,711 A | | 7/1981 | Sullivan |
| 4,402,202 A | | 9/1983 | Gombas |
| 4,446,714 A | | 5/1984 | Cvacho |
| 4,513,595 A | | 4/1985 | Cvacho |
| 4,519,232 A | | 5/1985 | Traczyke et al. |
| 4,547,645 A | | 10/1985 | Smith |
| 4,671,093 A | | 6/1987 | Dominico et al. |
| 4,697,414 A | | 10/1987 | McCarty |
| 4,774,839 A | | 10/1988 | Caleffi et al. |
| 4,808,053 A | | 2/1989 | Nagai et al. |
| 4,824,303 A | | 4/1989 | Dinger |
| H000906 H | | 4/1991 | Baggett et al. |
| 5,209,101 A | | 5/1993 | Finzer |
| 5,220,993 A | | 6/1993 | Scarpa et al. |
| 5,242,497 A | | 9/1993 | Miller et al. |
| 5,249,449 A | | 10/1993 | Lee et al. |
| 5,282,375 A | | 2/1994 | Lee et al. |
| 5,344,252 A | | 9/1994 | Kakimoto |
| 5,497,900 A | | 3/1996 | Caleffi et al. |
| 5,555,756 A | | 9/1996 | Fischer et al. |
| 5,590,558 A | | 1/1997 | Saunders et al. |
| 5,611,231 A | | 3/1997 | Marritt et al. |
| 5,676,006 A | | 10/1997 | Marshall |
| 5,718,030 A | | 2/1998 | Langmack |
| 5,755,130 A | | 5/1998 | Tung et al. |
| 5,768,931 A | | 6/1998 | Gombas |
| 5,771,807 A | | 6/1998 | Moss |
| 5,832,769 A | | 11/1998 | Schultz |
| 6,220,138 B1 | | 4/2001 | Sakamoto |
| 6,622,379 B1 | | 9/2003 | Kano |
| 6,637,247 B2 | | 10/2003 | Bowlin |
| 6,874,971 B2 | | 4/2005 | Albaugh |
| 7,219,790 B2 | | 5/2007 | Lanfranchi |
| 7,263,867 B2 | | 9/2007 | Bartosch et al. |
| 7,310,983 B2 | | 12/2007 | Schill et al. |
| 7,387,007 B2 | | 6/2008 | Schill et al. |
| 7,404,309 B2 | | 7/2008 | Schill et al. |
| 7,409,845 B2 | | 8/2008 | Schill et al. |
| 7,418,852 B2 | | 9/2008 | Schill et al. |
| 7,454,944 B2 | | 11/2008 | Schill et al. |
| 7,464,573 B2 | | 12/2008 | Shortridge |
| 7,530,445 B2 | | 5/2009 | Marshall et al. |
| 7,568,573 B2 | | 8/2009 | Schill |
| 7,770,425 B2 | | 8/2010 | Egerton et al. |
| 7,784,319 B2 | | 8/2010 | Saville |
| 7,805,970 B2 | | 10/2010 | Woulds |
| 7,818,987 B2 | | 10/2010 | Marshall |
| 7,886,894 B2 | | 2/2011 | Schill |
| 7,905,130 B2 | | 3/2011 | Marshall |
| 7,942,256 B2 | | 5/2011 | Coates |
| 7,997,111 B2 | | 8/2011 | Mercer et al. |
| 8,245,551 B2 | | 8/2012 | Egerton |
| 2003/0063949 A1 | | 4/2003 | Hohenocker |
| 2006/0101885 A1 | | 5/2006 | Schill et al. |
| 2006/0101889 A1 | | 5/2006 | Schill et al. |
| 2007/0227859 A1 | | 10/2007 | Marshall et al. |
| 2008/0282758 A1 | | 11/2008 | Shortridge et al. |
| 2009/0266128 A1 | | 10/2009 | Mercer et al. |
| 2009/0266130 A1 | | 10/2009 | Saville |
| 2010/0092266 A1 | | 4/2010 | Matsuo et al. |
| 2010/0095725 A1 | | 4/2010 | Sanginiti et al. |
| 2010/0212130 A1 | | 8/2010 | Marshall et al. |
| 2010/0212385 A1 | | 8/2010 | Marshall et al. |
| 2010/0212390 A1 | | 8/2010 | Marshall et al. |
| 2010/0213030 A1 | | 8/2010 | Green |
| 2010/0213677 A1 | | 8/2010 | Marshall |
| 2011/0108389 A1 | | 5/2011 | Bonnain |

FOREIGN PATENT DOCUMENTS

| | | |
|---|---|---|
| DE | 40 23 771 | 1/1992 |
| DE | 103 19 302 | 8/2004 |
| EP | 0 384 427 | 8/1990 |
| EP | 1 215 430 | 6/2002 |
| EP | 1 714 939 | 10/2006 |
| GB | 0 235 28 | 0/1910 |
| GB | 1 042 506 | 9/1966 |
| JP | 05-038476 | 2/1993 |
| JP | 2002-310178 | 10/2002 |
| JP | 2005-329434 | 12/2005 |
| WO | WO-88/05700 | 8/1988 |
| WO | WO-90/11839 | 10/1990 |
| WO | WO-96/33032 | 10/1996 |
| WO | WO-97/37786 | 10/1997 |
| WO | WO-98/19807 | 5/1998 |
| WO | WO-01/90591 | 10/2002 |
| WO | WO-2006/055185 | 5/2006 |
| WO | WO2008/111552 | 9/2008 |
| WO | WO-2010/099067 | 9/2010 |
| WO | WO-2010/099069 | 9/2010 |
| WO | WO-2010/099081 | 9/2010 |
| WO | WO-2010/099082 | 9/2010 |
| WO | WO-2010/099165 | 9/2010 |
| WO | WO-2010/099171 | 9/2010 |

OTHER PUBLICATIONS

American National Can; Drawings showing commericially available 5811-12 necker machine and Parts List; Oct. 1993; 4 pages.

American National Can; Extracts from brochure: 5811/5811-2 Necker Flanger Reformer—Periodic Inspection and Maintenance Procedures; Apr. 22, 1994; 9 pages.

American National Can; Extracts from brochure: ANC Necker Secrets Revealed, 1996; 3 pages.

International Search Report for PCT Application No. PCT/US2010/024926 dated May 27, 2010.

International Search Report for PCT Application No. PCT/US2010/024941 dated Jun. 23, 2010.

International Search Report for PCT Application No. PCT/US2010/024988 dated Jun. 14, 2010.

International Search Report for PCT Application No. PCT/US2010/024992 dated Jun. 2, 2010.

International Search Report for PCT Application No. PCT/US2010/025192 dated Jun. 18, 2010.

Partial Search Report for PCT Application No. PCT/US2010/025182 dated Jul. 14, 2010.

Notice of Opposition mailed May 12, 2010, to European Application No. 05817255. 2; Patent No. 1824622.

PCT International Search Report and the Written Opinion on application No. PCT/US2010/025182 dated Sep. 28, 2010; 17 pages.

USPTO Action on U.S. Appl. No. 12/501,135 mailed Nov. 8, 2011; 16 pages.

* cited by examiner

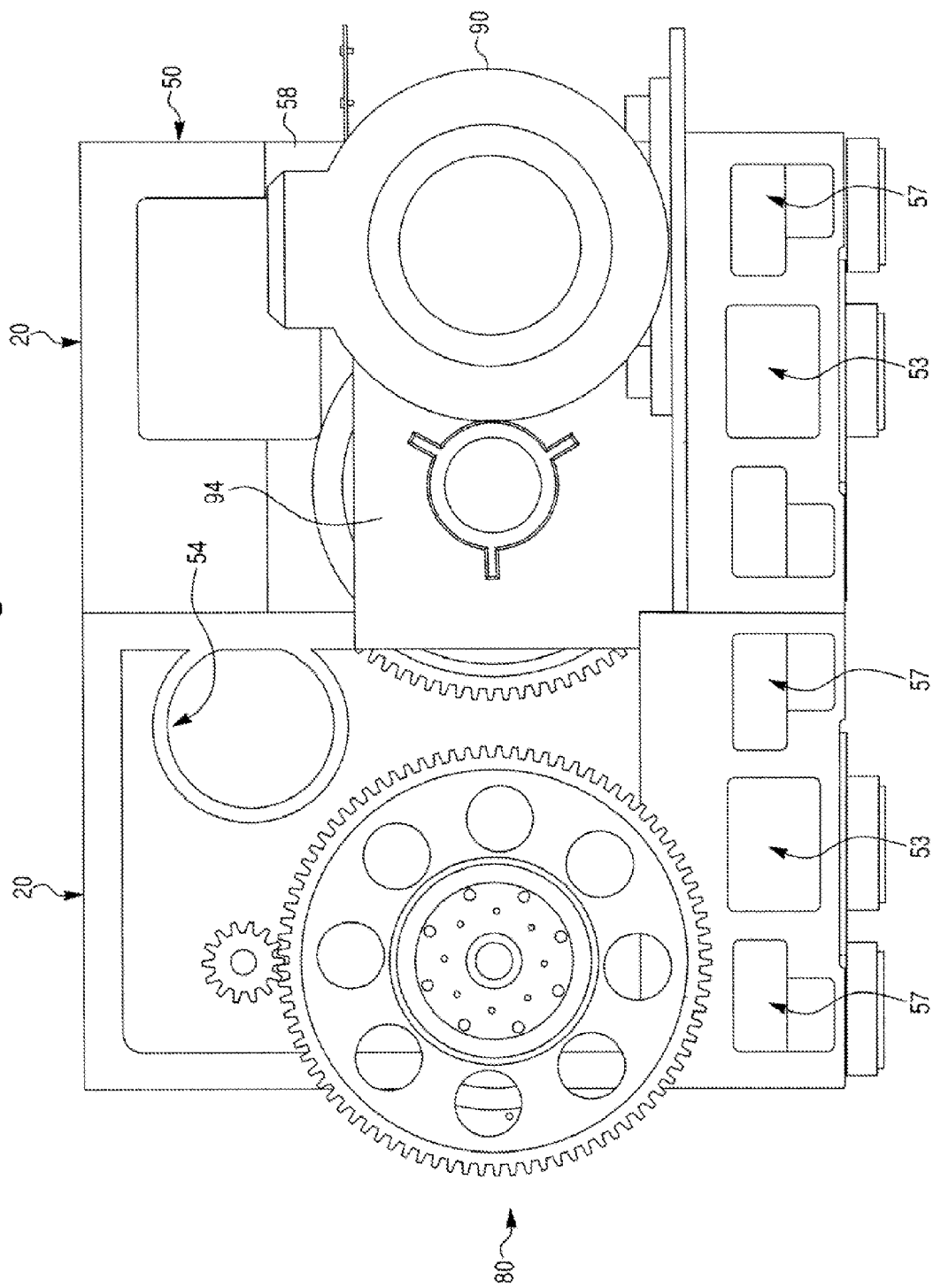

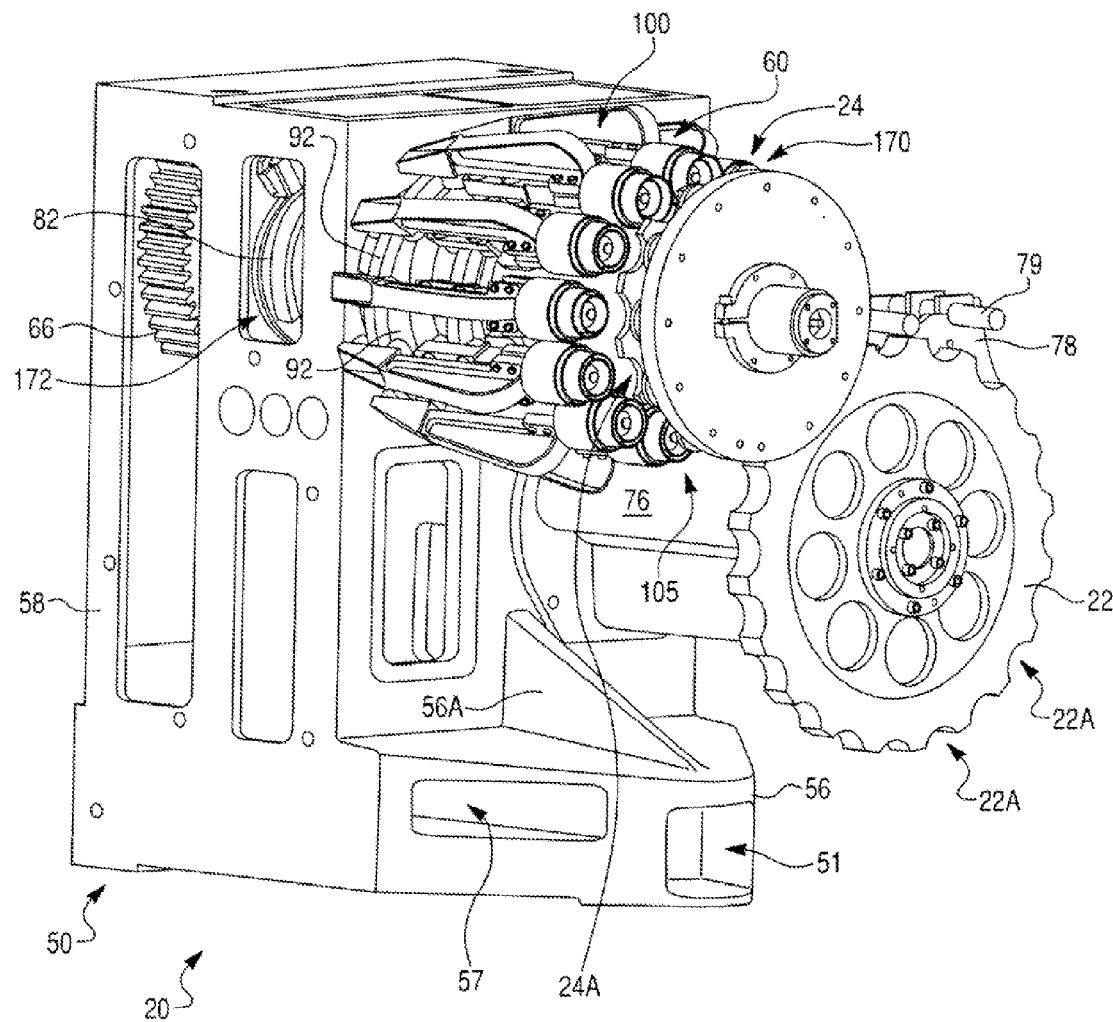

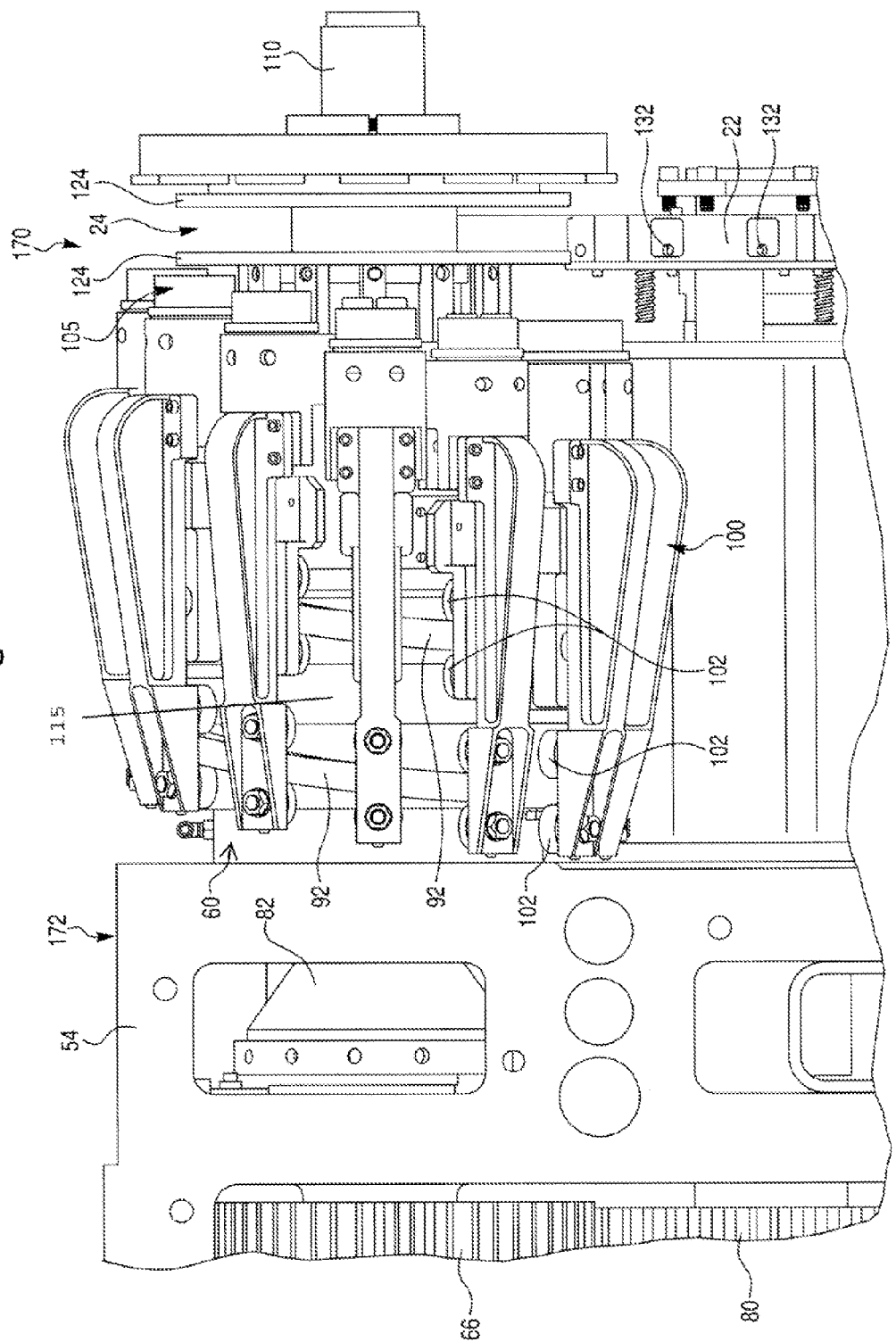

CAN PROCESSING MACHINE WITH CANTILEVER DESIGN

CROSS-REFERENCE TO RELATED APPLICATION

This present application is a divisional of U.S. patent application Ser. No. 12/711,891, filed Feb. 24, 2010, which claims the benefit of priority of U.S. Provisional Application No. 61/202,427, filed Feb. 26, 2009, both of which are hereby incorporated by reference in their entireties.

BACKGROUND

The present invention relates generally to the field of machine arrangements for processing articles, such as cans and metal bottles. More specifically, the invention relates to a machine arrangement that includes a cantilevered turret mechanism.

Conventional machine arrangements include a module base that supports a turret mechanism on both ends. Such an arrangement can utilize a great amount of floor space in a factory or working environment. Conventional machine arrangements are also arranged so that the drive mechanism may only attach to a single turret mechanism in the machine line.

SUMMARY

One exemplary embodiment of the invention relates to a machine module which operates on a plurality of articles. The machine module comprises: a modular base with a foot portion and a leg portion extending upward from the foot portion; and a cantilevered turret mechanism. The turret mechanism includes an article working end portion that is a cantilevered portion overhanging the foot portion of the base. The article working end portion includes tooling to perform a working operation on the plurality of articles.

Another exemplary embodiment of the invention provides a machine arrangement which operates on a plurality of articles. The machine arrangement comprises a plurality of machines arranged to cooperate with each other in a manner to form a machine arrangement. Each machine in the plurality of machines includes a modular base, a transfer star wheel, and a turret mechanism configured to perform a working operation on an article. The turret mechanism includes a turret star wheel. A central axis of the transfer star wheel is approximately 45 degrees below horizontal relative to a central axis of the turret star wheel.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 8 is a rear view of the two adjoining module bases according to FIG. 7A.

FIG. 9 is a front perspective view of a module illustrating a turret and transfer star wheel.

FIG. 10 is a detail side view of the turret and module of FIG. 9.

DETAILED DESCRIPTION

Figure 1:
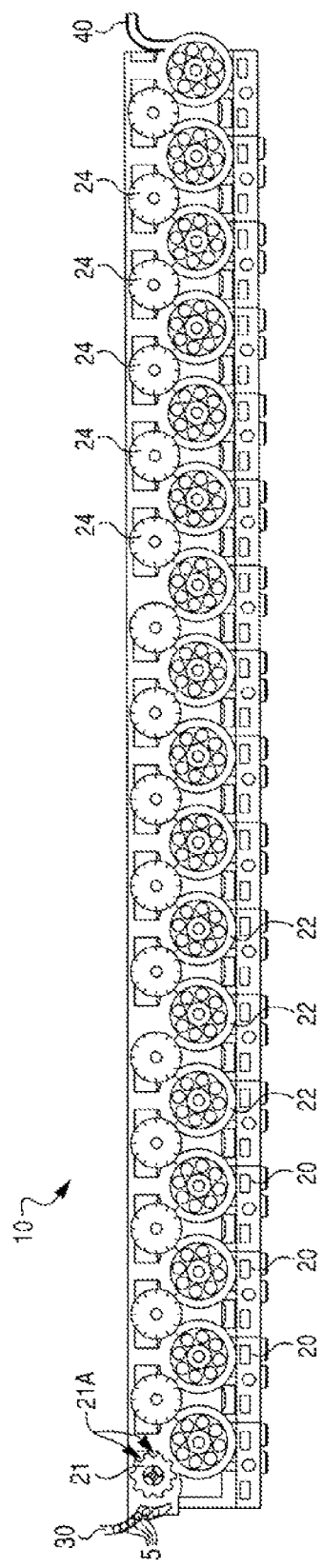
FIG. 1 is a schematic view of a machine line according to an embodiment of the invention.

One embodiment of the invention relates to a machine arrangement which operates on a plurality of articles. The machine arrangement comprises a plurality of machine modules arranged to cooperate with each other in a manner to form a machine arrangement. At least one of the machine modules, and preferably all of the modules, comprise a turret mechanism configured to modify articles by performing a working operation on the articles as the articles pass from an article infeed, through the machine arrangement or machine line, and to an article discharge of the machine arrangement. The articles move along a path in the machine arrangement having a predetermined configuration.

Machines or machine modules may be used to form, process or otherwise perform a working action on an article. In a machine line, an article is first fed into a first machine by an infeed mechanism to fill pockets in a star wheel, such as an infeed star wheel or a turret star wheel. The articles are then passed to a transfer star wheel adjacent the turret. The articles are then passed from the transfer star wheel to a turret star wheel. While each article is in a pocket of the turret star wheel, a corresponding ram assembly moves tooling toward and away from the article to perform a working operation, such as necking.

The article is then passed from the turret star wheel to a transfer star wheel, which transfers the article to another machine in the machine line that will perform another stage of the working operation on the article. When all processing/necking stages are complete, the article is discharged from the machine line. The machine line may be a recirculated machine line, a linear line, or any other type of machine line.

Each star wheel may have any number of pockets to hold articles for processing or transfer. For example, a turret star wheel may have six, eight, ten, twelve, or more stations to hold six, eight, ten, twelve, or more articles, respectively.

Each transfer star wheel has any number of pockets to hold articles for processing or transfer. For example, the transfer star wheel may have twenty pockets, or any other suitable amount. It will be recognized that a star wheel is capable of having one station up to any suitable number of stations. The transfer star wheel may have the same amount of pockets as the turret star wheels. Alternatively, the transfer star wheels may have more pockets then the turret star wheels.

The articles, in an embodiment, remain stationary in an axial direction while the dual ram assembly moves toward and away from the article to perform the working operation.

Embodiments of the invention will now described with reference to the figures.

FIGS. 1-15 illustrate a machine arrangement 10 and modules 20 and turret mechanisms 60 for the machine arrangement 10. The machine arrangement 10 is configured to perform a working operation on an article 5. The working operation may comprise, for example, necking, flanging, reprofiling, reforming, light testing, or any other suitable working operation. The machine arrangement 10 may be configured to operate a single working operation, or any suitable combination of working operations.

Figure 14:
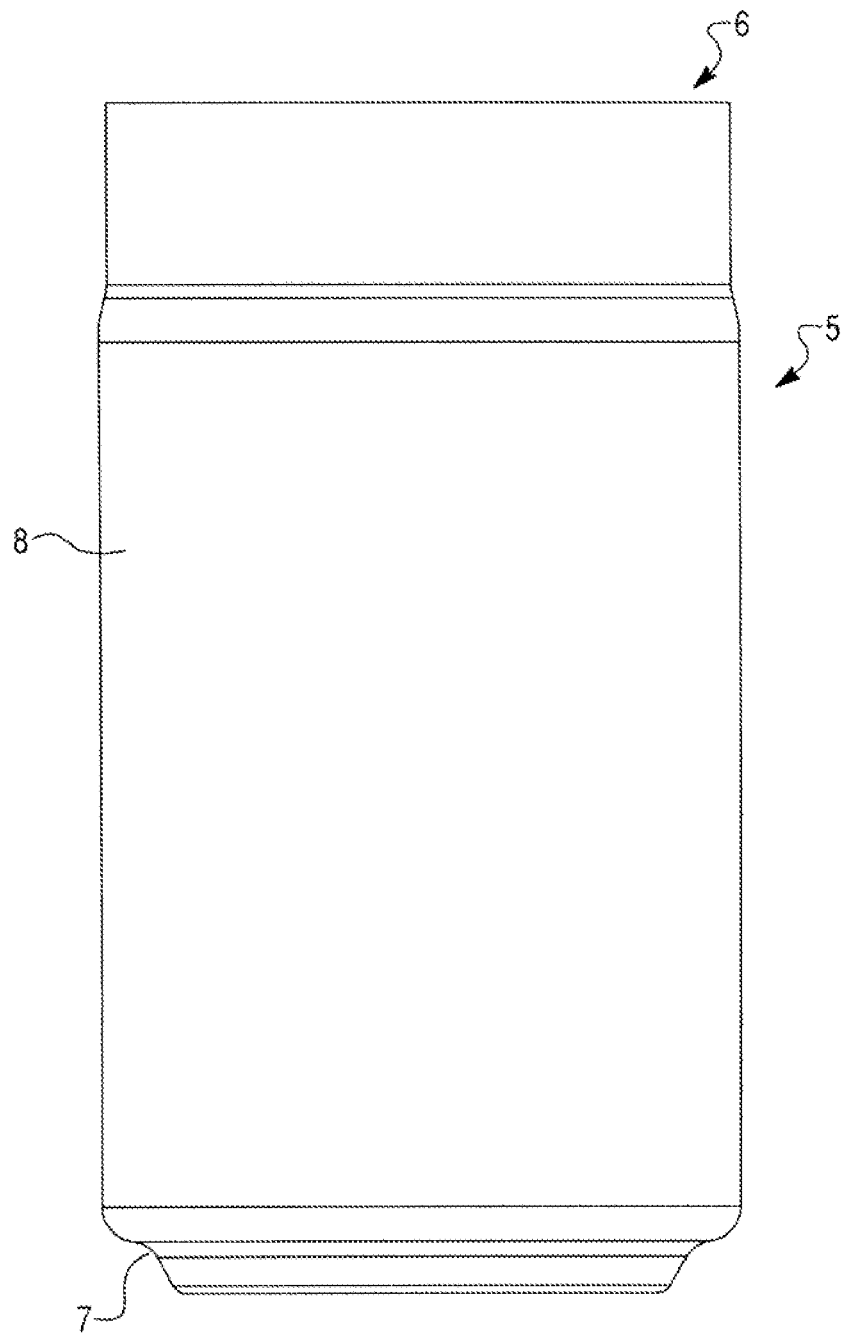
FIG. 14 is a schematic view of a can after a first necking operation according to an embodiment of the invention.

The article 5 may be a can, any suitable food or beverage container, jar, bottle or any other suitable article. The article 5 has an open end 6, opposite closed end 7, and a sidewall 8 extending from the closed end 7, such as shown in FIG. 14. Alternatively, the article 5 may be open at both ends. A top, lid, or other closure may be added to the article 5 during an operation in the machine arrangement 10, or at a later stage.

For exemplary purposes only, the below description will describe the mechanisms and methods for use on a can 5. It will be recognized that any other type of article (such as that described above) may be used.

Embodiments of the invention relate to mechanisms to use in can making machinery. More specifically, can die necking machines or flanging machines. In the can necking process, the open end 6 of the can 5 is reduced in diameter. In most cases, many reductions are required for the can necking process. In the flanging process, a flange is added to the open end 6 of the can 5. Sliding dual ram assemblies 100 (FIGS. 9-10) are used to guide and control the interaction of the forming tooling 105 and the can 5. The can 5 is pressurized with air to strengthen the body of the can 5 and resist the forces of necking, flanging, or any other working operation, in order to stabilize and hold the can 5 in the proper position during the working/forming process.

FIG. 1 illustrates an embodiment of a machine arrangement or line 10. In the machine line 10, cans 5 are fed into the infeed mechanism 30. The cans 5 are then passed to pockets 21A in the infeed transfer star wheel 21, which then passes the cans to corresponding pockets 22A in a transfer star wheel 22. Alternatively, the infeed mechanism 30 may pass the cans 5 directly into a transfer star wheel 22 or turret star wheel 24 in a module 20. The cans 5 continue through the machine line 10 by passing through corresponding pockets 22A, 24A in the alternating transfer star wheels 22 and turret star wheels 24. At the end of the machine line 10, the cans 5 exit the machine line 10 via a discharge mechanism or path 40. The turret star wheel 24 and transfer star wheel and, thus, the cans 5 continuously rotate throughout the machine arrangement 10 as the cans 5 pass from one module 20 to the next module 20. From the transfer star wheel 22, the cans 5 are passed to pockets 24A in a turret star wheel 24 on a turret 60. In the pockets 24A of the turret star wheel 24, the can 5 undergoes a working operation (e.g., necking operation) by the tooling 105 (FIG. 10) on the appropriate dual ram assembly 100 that corresponds to the pocket 24A on the turret star wheel 24.

While the invention is not so limited, embodiments of the invention may comprise forming/necking turrets 60 or flanging turrets 60', with one or more dual ram assemblies 100, constructed as modules 20. The use of modules 20 allows for the machine line or arrangement 10 to be assembled and changed to provide as many forming stages as is required and to allow for adding additional stages such as flanging, necking, trimming, curling, threading, and/or base reforming/reprofiling stages, which may added and/or removed as desired.

Figure 2:
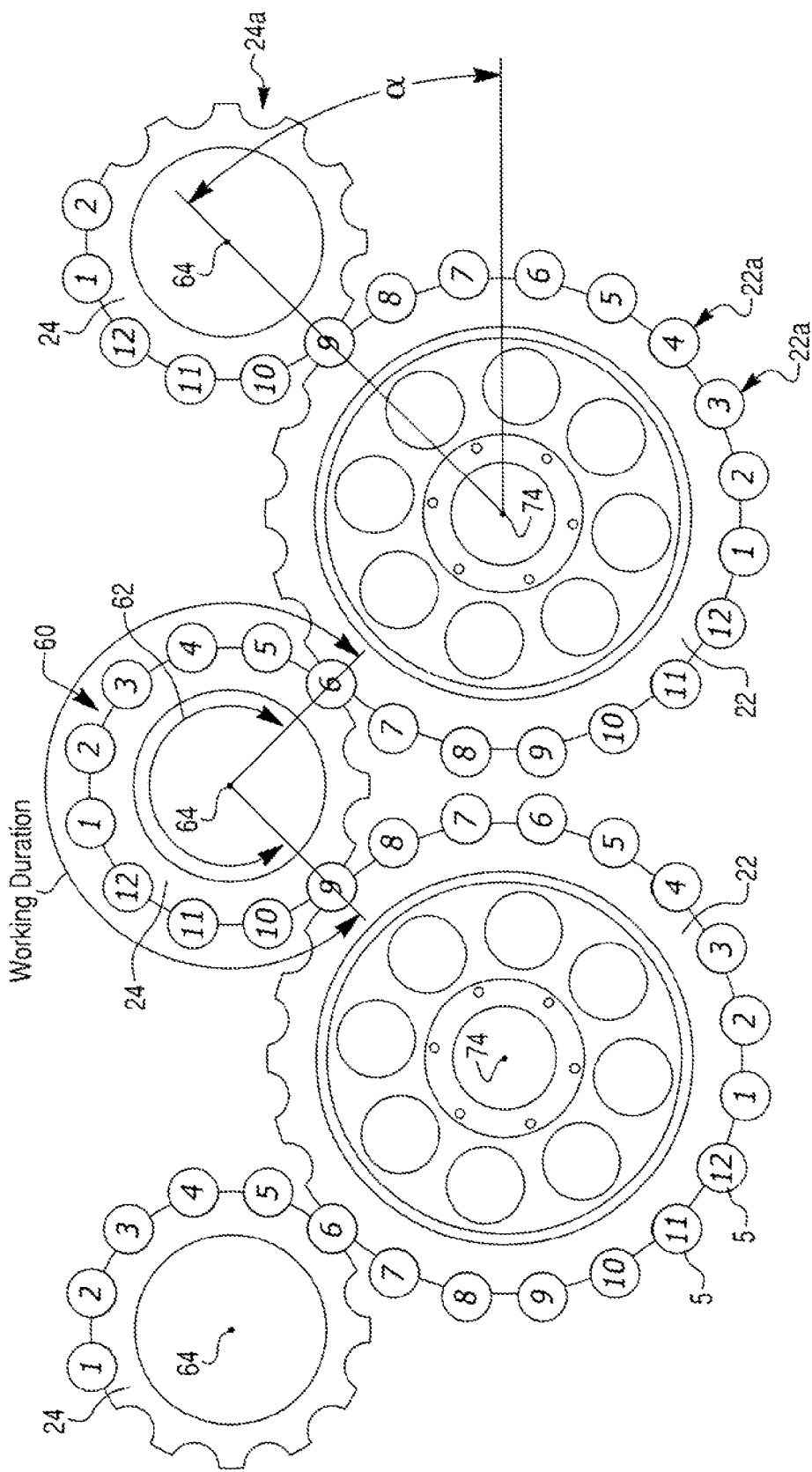
FIG. 2 is a schematic view of turret and transfer star wheels illustrating a staggered path in the machine line.

As can be best seen in FIG. 2, the machine line 10 includes a staggered, non-linear (or serpentine) path for the cans 5. The transfer star wheels 22 are positioned below the turret star wheels 24 so that a central axis 74 of each transfer star wheel 22 is positioned at an angle $\alpha$ approximately 45 degrees below horizontal relative to a central axis 64 of the turret star wheel 24. The turret star wheel 22 is thus able to have more pockets 22A then the turret star wheel 24. For example, the transfer star wheel 22 has twenty pockets 22A, whereas the turret star wheel has twelve pockets 24A. The cans 5 are thus able to pass around a working angle 62 of the turret mechanism 60 that is approximately 270 degrees. In other words, the cans 5 undergo at least a portion of a working operation in a turret 60 for approximately 270 degrees around the turret 60. As can be seen in FIG. 2, at least ten out of the twelve pockets 24A in the turret star wheel 24 may be occupied by cans 5 at any one time. Furthermore, at least sixteen out of twenty pockets 22A in the transfer star wheel 22 may be occupied by cans 5 at any one time.

In the arrangement illustrated in FIGS. 1 and 2, the turret 60 can operate on a can 5 faster, while utilizing a longer cam angle of 270 degrees, such as shown by the working angle 62 in FIG. 2. For exemplary purposes only, the turrets 60 can rotate at approximately 300 rpm while working on the cans 5 in the machine line 10.

Figure 3:
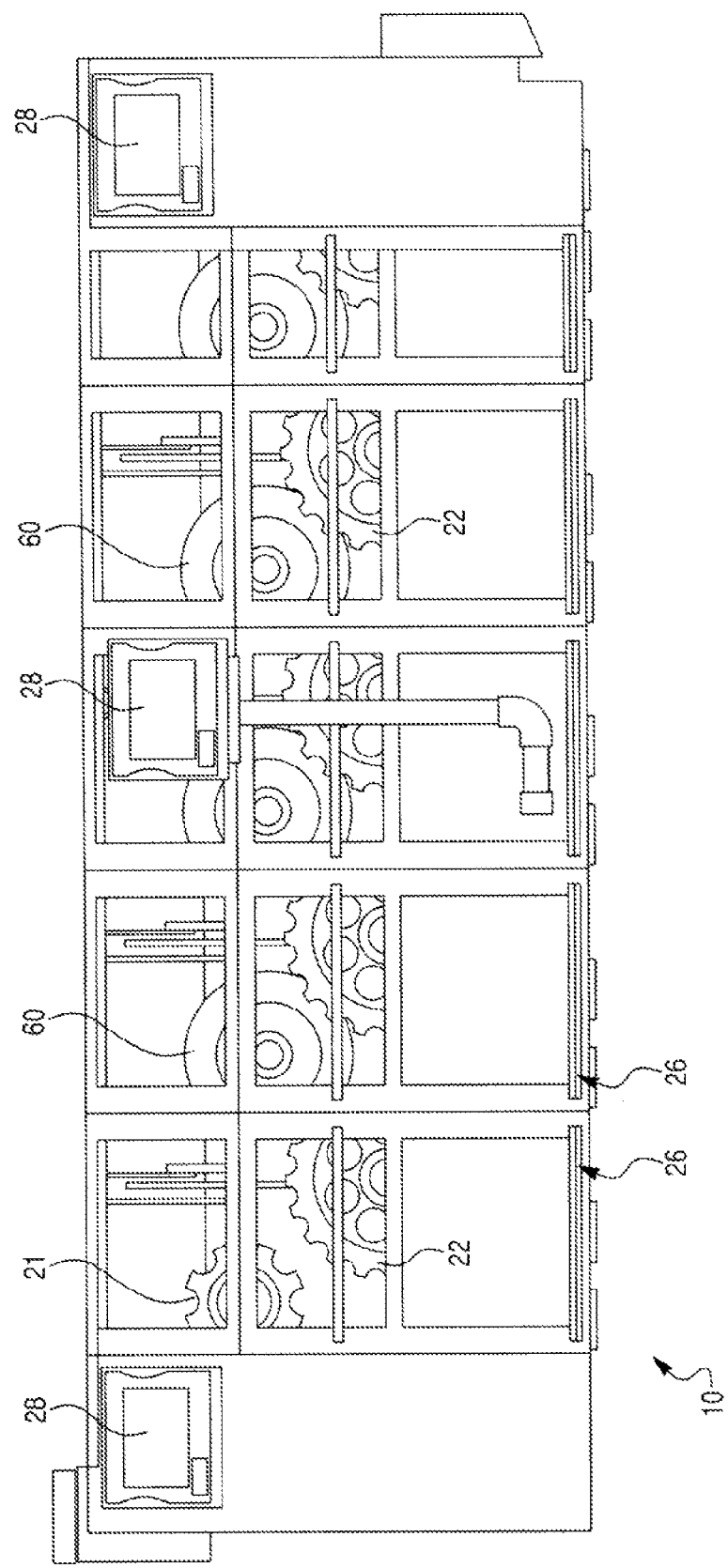
FIG. 3 is a front perspective view of a machine line illustrating user workstations and guard covers.

FIG. 3 also illustrates an embodiment of a machine line 10 in which the module guard covers (sometimes referred to as coverings or enclosures) 26 are shown closed over each module 20. The machine line 10 may include workstations or monitors 28 that enable an operator to control and monitor the machine line 10. The workstations 28 and guard covers 26 shown are illustrative examples only.

In the embodiment shown in FIG. 1, the machine arrangement 10 comprises an infeed track or mechanism 30 to feed the cans 5 into the machine arrangement 10 and an intake star wheel 21. The intake star wheel 21, in an embodiment, includes half as many pockets 21A as the transfer star wheels 22. The intake star wheel 21 may have, for example, ten pockets 21A such that the corresponding transfer star wheels 22 have, for example, twenty pockets 22A, respectively. Of course, any other suitable number of pockets 21A, 22A may be utilized.

Figure 4:
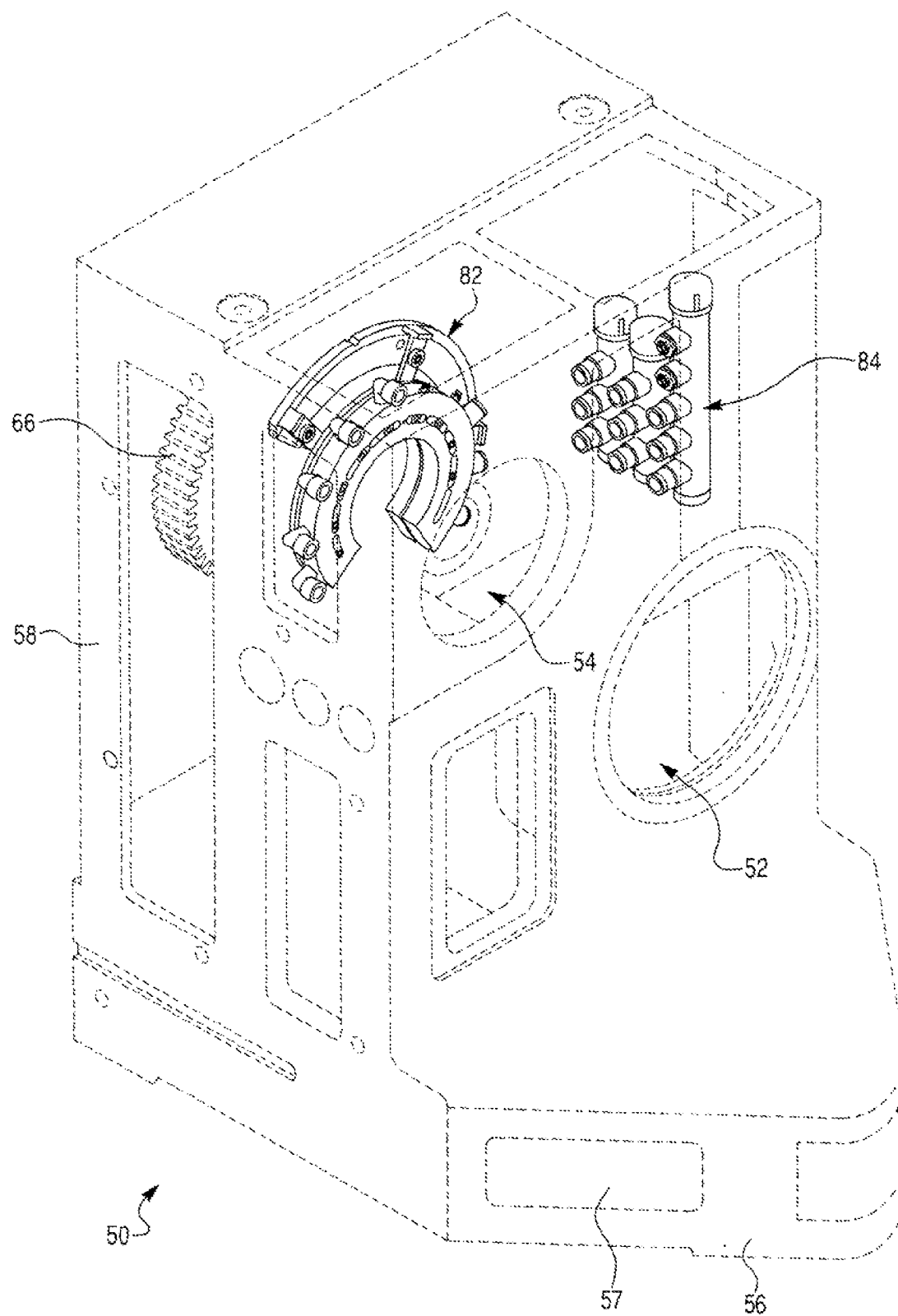
FIG. 4 is a front perspective view of a module base showing an air manifold and an air supply mechanism for the module.

Each module 20 includes a modular and interchangeable base 50. Each base 50 is configured to support a cantilevered turret 60 with turret star wheel 24 and a cantilevered transfer star wheel 22, such as seen in FIG. 9. In FIG. 4, a base 50 is illustrated without the turret 60 or transfer star wheel 24. The base 50 includes a leg portion 58 and a foot portion 56. The base 50 is configured to support the cantilevered turret 60 by, for example, the foot portion 56 and gusset 56A (see FIG. 7A). The foot portion 56 and gusset 56A support the weight and arrangement of the turret 60 and transfer star wheel 22. The gusset 56A extends upward from the foot portion 56 toward the leg portion, according to one embodiment, is similarly shaped to a fin.

The base 50 and, thus, each module 20 has a minimal footprint configured to save space in a factory or building in which the module 20 is used. Numerous modules 20 may be required for a single machine arrangement 10, and the smaller footprint of the base 50 permits a machine arrangement 10 to fit in a smaller space. Each base 50, such as shown in FIGS. 4-9, includes openings 57 arranged and sized to accommodate forklift prongs. Each base 50 includes, for example, two forklift openings 57 arranged to permit forklift prongs to be inserted into the openings 57 from a rear portion of the base 50 to pick up the base 50. As can be seen, for example, in FIGS. 4, 5, and 7, the forklift openings 57 extend through the foot portion 56 of the base 50 to the front of the base 50. The size, shape, amount, and placement of the forklift openings 57 are shown for exemplary purposes only and may be changed as appropriate for a specific use or need.

Figure 6:
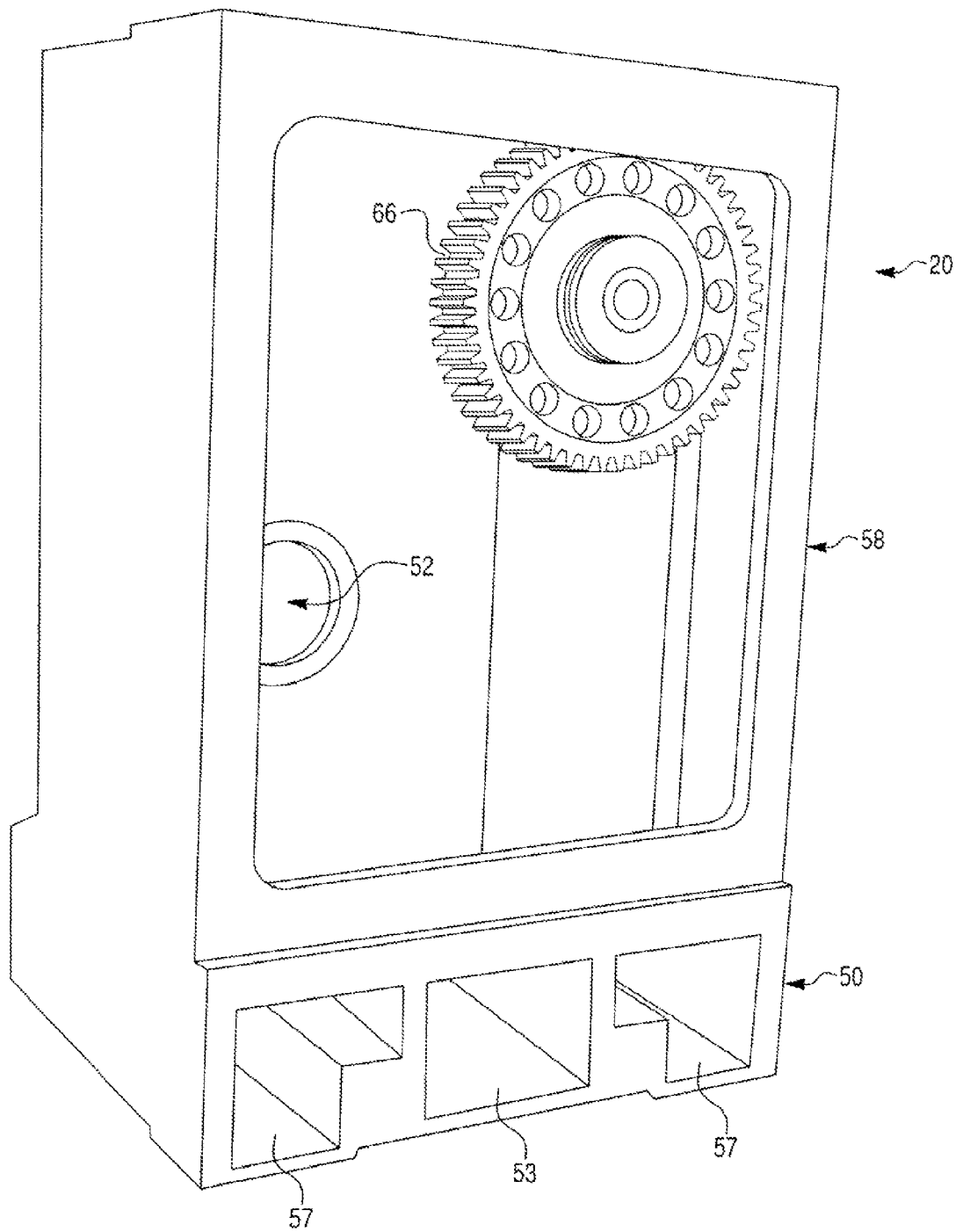
FIG. 6 is a rear perspective view of a module base illustrating forklift openings and a turret gear.
Figure 7A:
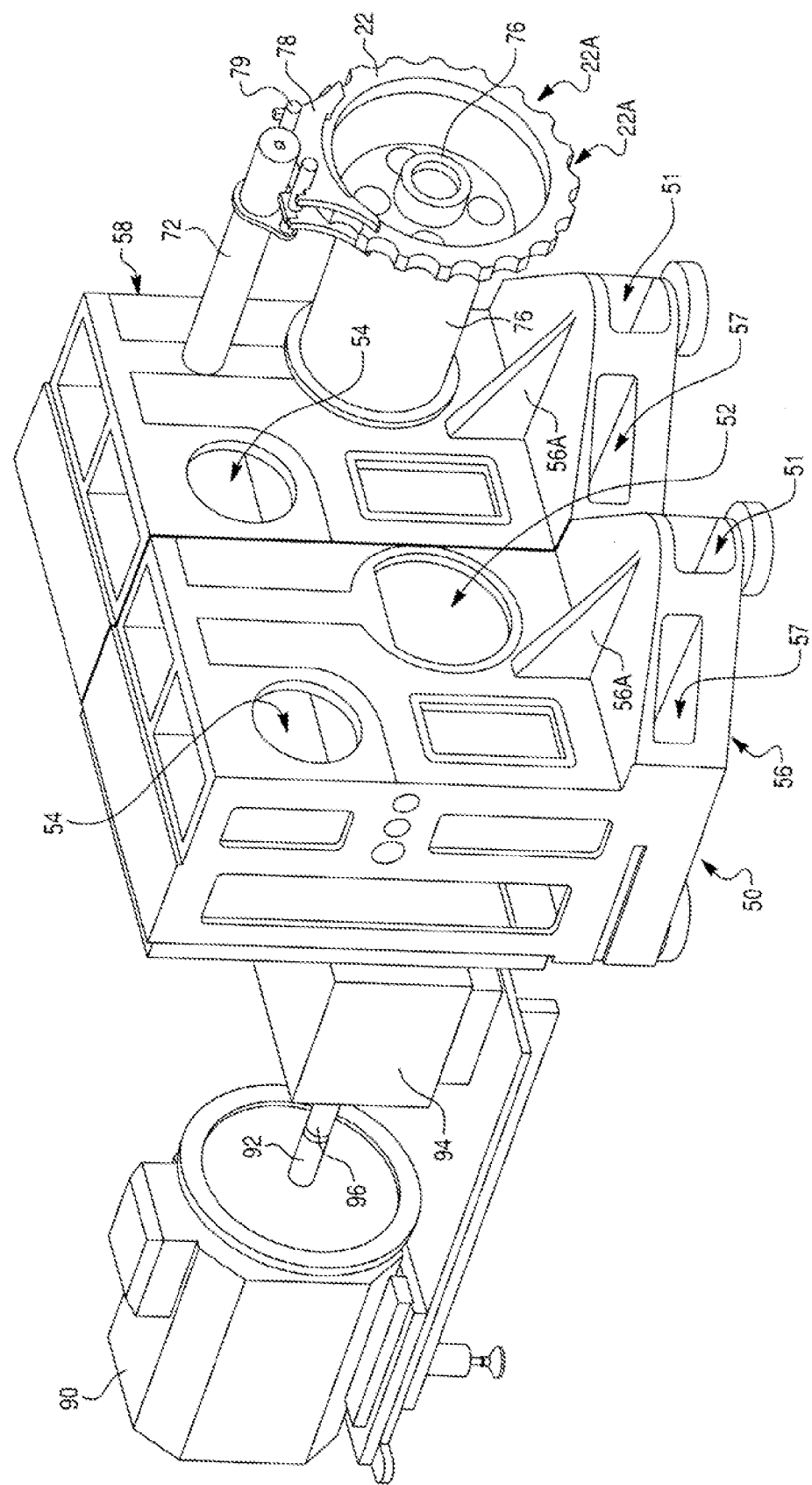
FIG. 7A is a front perspective view of two adjoining module bases in which the motor and reducer are shown, and only components of one transfer star wheel are shown.

As seen in FIG. 7A, the base 50 also includes a center opening 51 at the front of the base 50. Vibration isolator pads are mounted to the base 50 via the opening 51. Access for mounting of the vibration isolator pads is provided by the opening 51. As shown in FIGS. 6 and 8, the base 50 further includes a center opening 53 at the rear of the base 50. A blower vacuum enters the module 20 for the transfer star wheel 22 through the opening 53.

Each base 50 further includes a transfer star wheel opening 52 and a turret opening 54, such as shown in FIGS. 4 and 7A. The transfer star wheel 22 connects to a transfer gear 80 via a central shaft 76 that extends through the opening 52 in the base 50. A portion of the turret 60 extends through the turret opening 54 in the base 50 and connects to a turret gear 66 via a turret shaft 190 (See FIG. 11).

Figure 5:
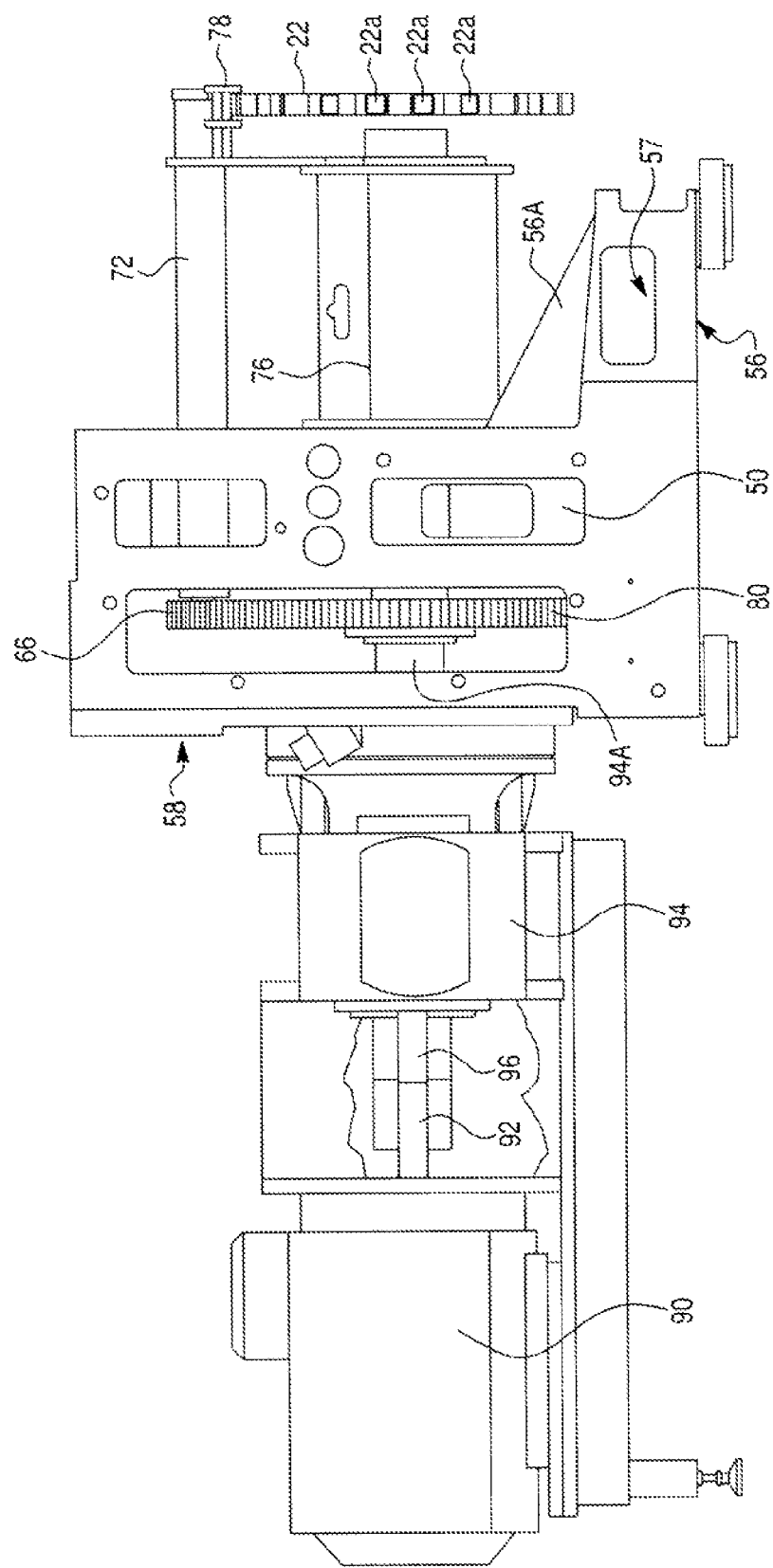
FIG. 5 is a side view of a module base showing a motor and reducer attached thereto, and components of a transfer star wheel.

Since each base 50 and, thus, module 20 are modular or interchangeable in configuration, the drive arrangement for the machine arrangement 10 may connect to any of the modules 20 in the machine arrangement 10 to drive the machine arrangement 10. The drive arrangement, such as shown in FIGS. 5 and 7A, includes a motor 90 and a reducer 94 (sometimes referred to as a gearbox). The motor 90 and reducer 94 are coupled in line to one module 20. For example, reducer coupling shaft 94A (sometimes referred to as an input shaft) of the reducer 94 connects to the transfer gear 80, such as shown in FIG. 5.

As best shown in FIGS. 5 and 7A, the motor 90 and reducer 94 are directly connected to each other by a motor shaft 92 being directly coupled to a reducer shaft 96. As a result of the direct coupling of the motor 90 to the reducer 94, in an embodiment, the driver arrangement does not require additional belts or pulleys for the coupling.

Figure 7B:
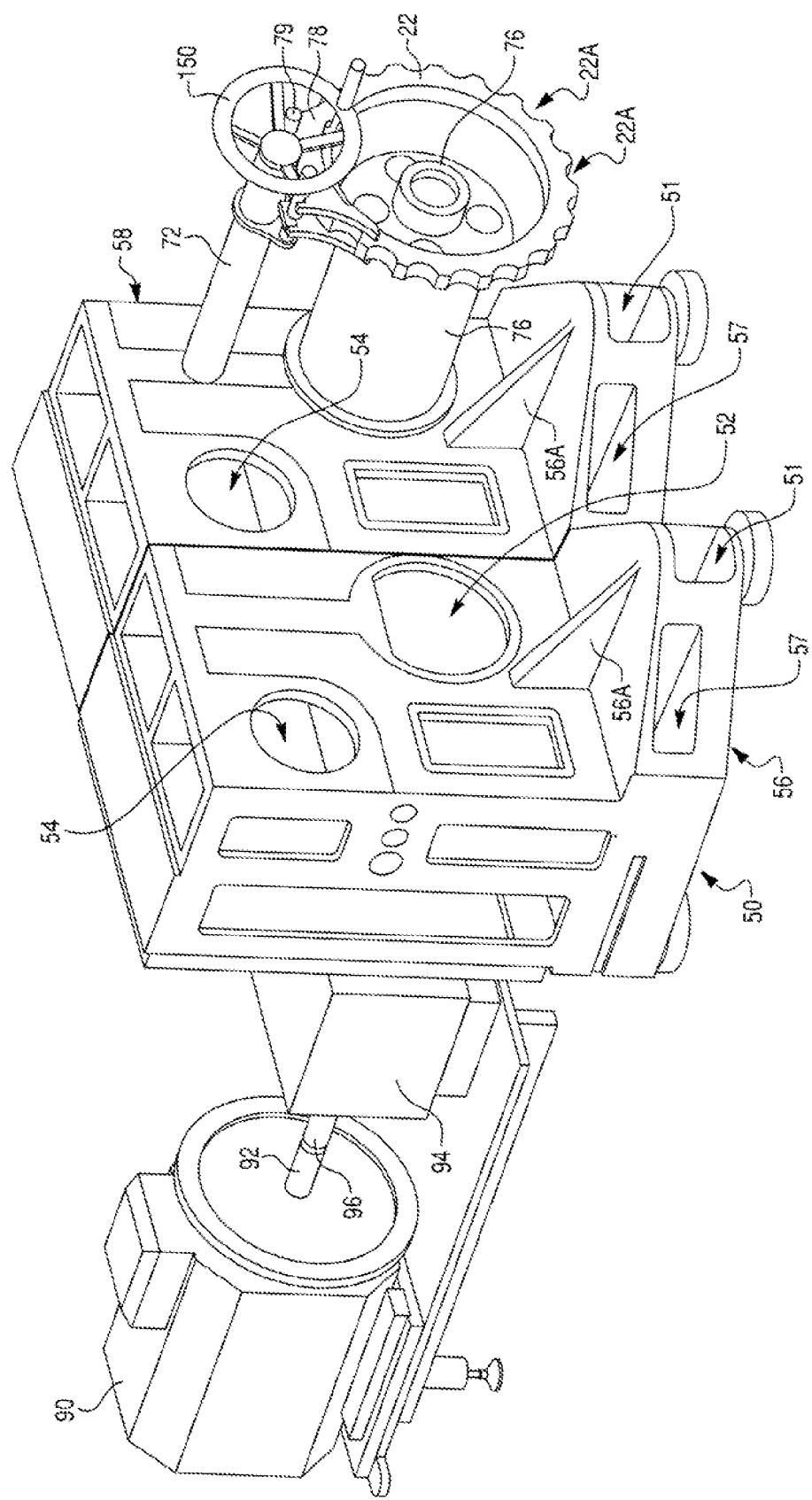
FIG. 7B is a front perspective view of two adjoining module bases of FIG. 7B in which a hand wheel is shown attached to a shaft.
Figure 13:
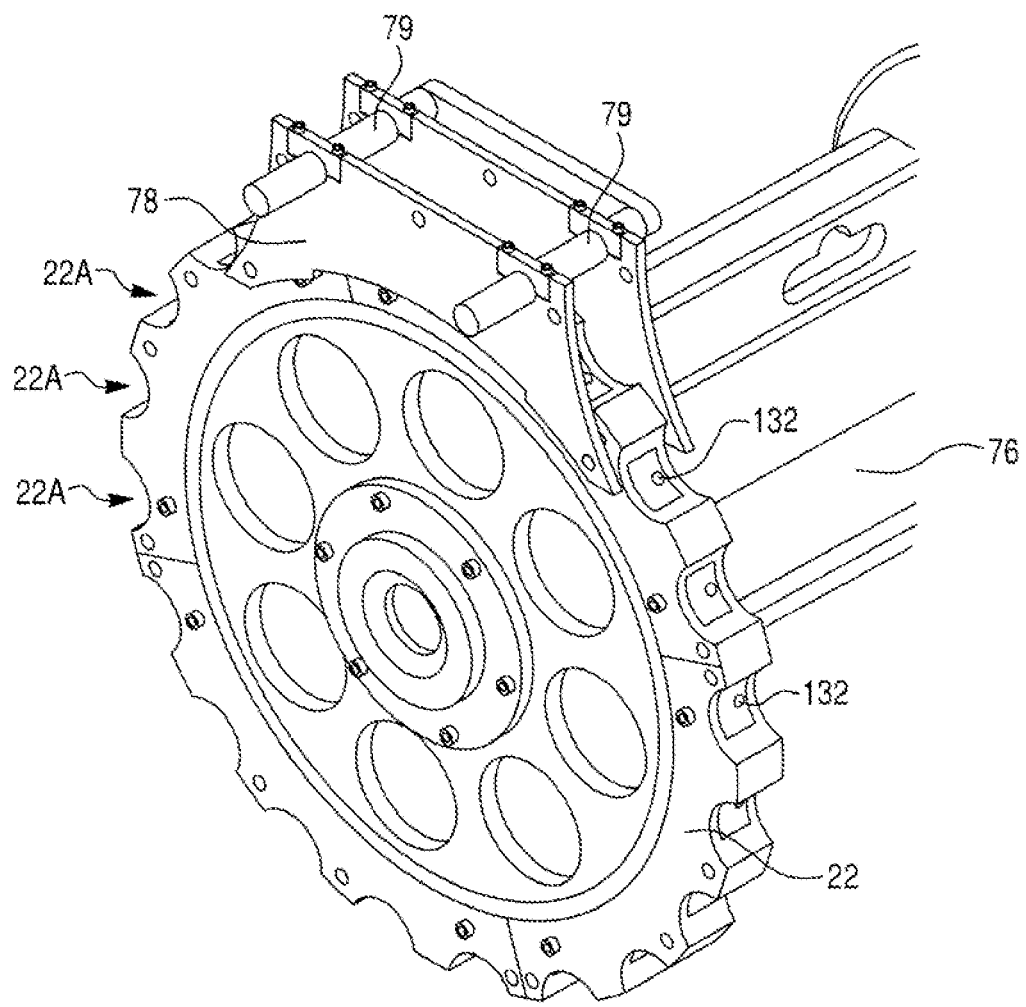
FIG. 13 is a front perspective view of a transfer star wheel illustrating a central transfer star wheel shaft and support bracket.

FIGS. 5 and 7B illustrate a transfer star wheel support shaft 72 that is utilized in addition to a transfer star wheel central shaft and housing 76, although not shown in FIG. 13. The support shaft 72 is connected to the transfer star wheel 2 via a bracket 78 and bracket rods 79. In order for an operator to adjust or manipulate the machine arrangement 10 or a module 20, such as for maintenance purposes, a hand wheel 150 can be coupled to the end of the transfer star wheel support shaft 72 (FIG. 7B). Manual turning of the hand wheel 150 will turn over the machine arrangement 10 as much or as little as desired so that the operator can view or adjust a desired portion of the machine module 20. The hand wheel 150 may be moved manually or by another suitable mechanism. Alternatively, another type of rotation device, such as a ratchet wrench or crank) may be utilized in place of or in addition to the hand wheel 150. The hand wheel 150 may be removably attached to the support shaft 72.

As best seen in FIGS. 9 and 10, the turret 60 is a cantilevered turret 60. Thus, the turret 60 is supported at a base end portion 172 in the leg portion 58 of the base 50. The turret star wheel 24 is attached to a working end portion 170 of the turret 60. The cantilevered working end portion 170 overhangs the foot portion 56 of the base 50. The turret 60 includes a turret shaft 190 and a turret star wheel shaft 110, which is at the working end portion 170 of the turret 60. The turret shaft 190 connects to the turret gear 66 at the base end portion 172. The turret 60 further includes a bearing 115, dual ram assemblies 100, dual cams 92, and an air manifold 82, such as shown in FIG. 10.

The dual ram assemblies 100 are positioned around the circumferential surface of the turret 60. Each dual ram assembly 100, as shown in FIGS. 9-10, includes cam followers 102 that are configured to follow the path or surface of cams 92 positioned on a bearing 115 (FIG. 10) of the turret 60. Each ram assembly 100 includes tooling 105 to perform a necking or other working operation on the can 5. The tooling 105, for example, includes an inner knockout tool and an outer die tool (not shown). An open end 6 of the can 5 is positioned in the pocket 24A so that the tooling 105 is positioned appropriately to he inserted into and/or around the open end 6 of the can 5 so that the tooling 105 performs the necking or other suitable working operation.

100501 As the cam followers 102 follow their respective cam surfaces 92, the tooling 105 slides toward or away from a can 5 to be worked on in a corresponding pocket 24A in the turret star wheel 24. When the tooling 105 reaches the can 5, the tooling 105 performs a necking operation on the can 5, and then withdraws as the cam followers 102 continue following the path of their respective cam surface 92. As can be seen in FIG. 10, each dual ram assembly 100 includes two sets of cam followers 102 that each follow a different cam 92 on the turret 60. The cams 92 are arranged so that the cans 5 follow a 270 degree path 62 around the turret 60 (FIG. 2).

The transfer star wheel 22, the turret 60, tooling 105, and the corresponding turret star wheel 24 are arranged so that the cans 5 do not move in an axial direction toward and away from the tooling 105 or turret 60. Rather, the cans merely rotate around the turret 60, while the dual ram assemblies 100 and corresponding tooling 105 move in an axial direction toward and away from the cans 5.

Figure 11:
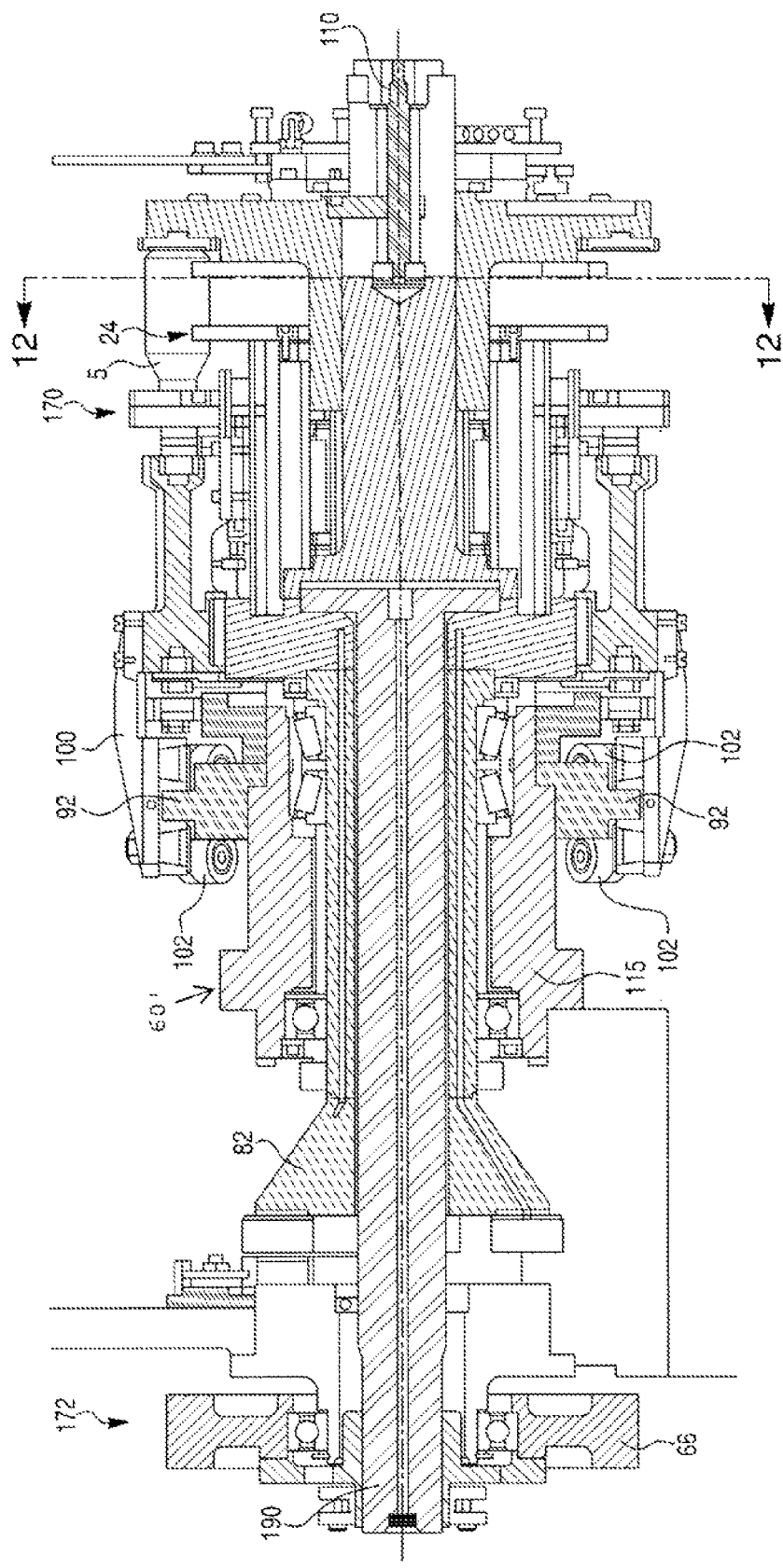
FIG. 11 is a sectional view of a flanger turret.
Figure 12:
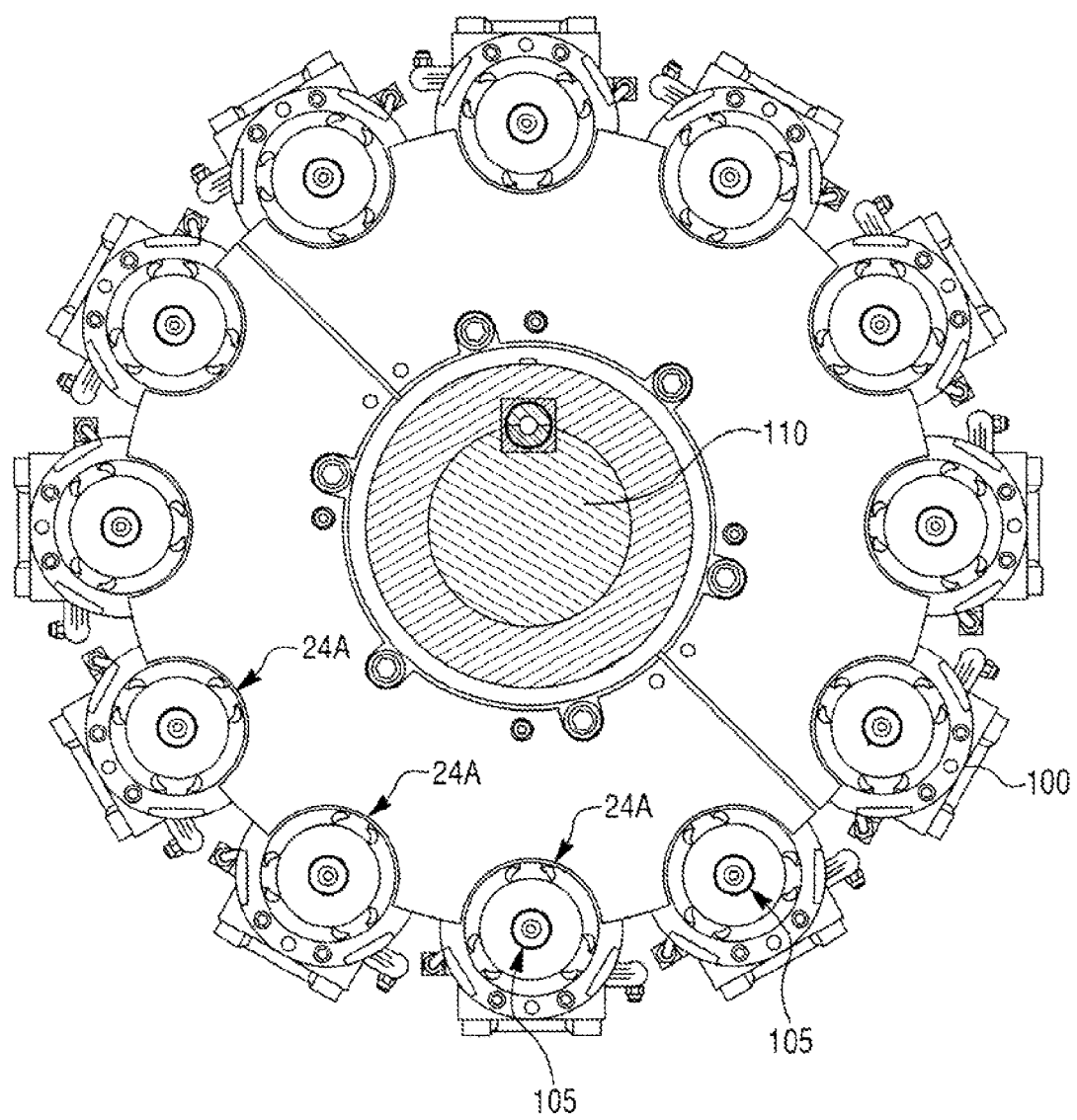
FIG. 12 is a cross-sectional view of the flanger turret taken along line 12-12 in FIG. 11.

In an exemplary embodiments, the turret may be a flanging turret 60', as shown in FIGS. 11 and 12. The flanging turret 60' is similar to the turret 60 described above except that the flanging turret 60' is provided with tooling 105 to perform a flanging operation on a can 5. FIG. 11 illustrates the position of the can 5 in the flanging turret 60' (which is similar to the position of a can 5 in turret 60). FIG. 12 illustrates a cross-sectional view of the flanging turret 60' that illustrates a working end of the dual ram assemblies 100 and tooling 105, as well as the turret star wheel shaft 110.

In one embodiment, the cans 5 are held in position on a transfer star wheel 22 using a pneumatic pressure differential or "suction". The transfer star wheels 22 may have a vacuum port 132 (FIG. 13), formed in a channel portion, fluidly communicating with a source of vacuum (negative pneumatic pressure) via a suitable manifold (not shown). The vacuum delivered to the vacuum ports 132 and the surface area of the cans 5, which are exposed to the suction, is increased to a degree that the cans 5 are stably held in position in each pocket 22A of the transfer star wheel 22.

FIG. 13 illustrates an embodiment of the transfer star wheel 22. The transfer star wheel 22 is attached to the module base 50 through a transfer star wheel base opening 52 (FIG. 4). The transfer star wheel 22 is attached via a transfer star wheel central shaft and housing 76, through which the vacuum source fluidly communicates with the vacuum ports 132.

Figure 15:
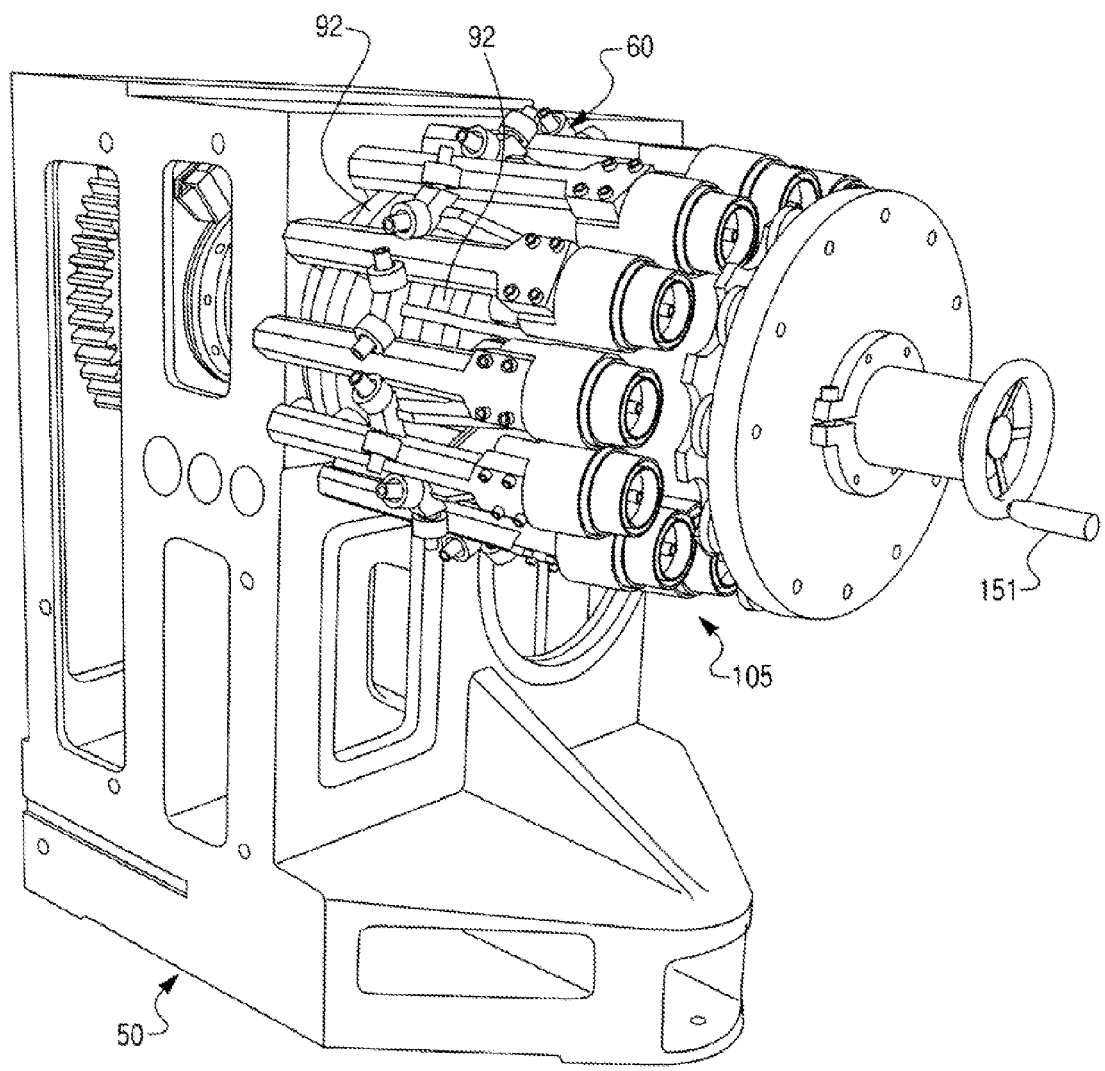
FIG. 15 is a front perspective view of a module in which a hand wheel is shown attached to a turret according to an embodiment of the invention.

As shown in FIG. 15, the turret 60 can further include a crank or hand wheel 151. The hand wheel 151 may be removably attached to the turret 60. Turning of the hand wheel 151 will adjust the distance between the star wheel 24 and tooling 105 so that the turret 60 can accommodate cans 5 of different heights (lengths). The hand wheel 151 may be removed once the adjustment has been made. The hand wheel 151 may be turned manually or by any other suitable mechanism. Alternatively, another type of rotation device, such as a ratchet wrench or crank, may be utilized in place of or in addition to the hand wheel 151.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the machine module and/or machine arrangement as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A machine arrangement which operates on a plurality of articles comprises:
    a plurality of machines arranged to cooperate with each other in a manner to form a machine arrangement,
    each machine in the plurality of machines includes a modular base, a transfer star wheel having 20 transfer pockets, and a turret mechanism configured to perform a working operation on an article, the turret mechanism including a turret star wheel having 12 support pockets, and
    wherein a central axis of the transfer star wheel is 45 degrees below horizontal relative to a central axis of the turret star wheel.

2. The machine arrangement of claim 1, further comprising a drive motor and a reducer configured to drive the plurality of machines, and wherein any one of the machines in the plurality of machines can be connected to the drive motor and reducer.

3. The machine arrangement of claim 2, wherein the drive motor is coupled directly to the reducer.

4. The machine arrangement of claim 1, wherein each of the machines in the plurality of machines is modular in design.

5. The machine arrangement of claim 1, wherein the modular base of each machine in the plurality of machines has the same configuration as the modular base of all other machines in the plurality of machines.

6. The machine arrangement of claim 1, wherein the turret mechanism includes a 270 degree working angle, such that articles placed in the turret star wheel undergo a working operation along 270 degrees around the central axis of the turret star wheel.

7. The machine arrangement of claim 1, wherein the plurality of articles in the turret star wheel moves continuously in a machine processing direction.

8. The machine arrangement of claim 1, wherein each turret mechanism of each of the machines includes two cams, and
    wherein the turret mechanism includes a ram assembly with cam followers and tooling configured to follow the two cams and move the tooling toward and away from an article of the plurality of articles that is positioned in a corresponding pocket in the turret star wheel.

9. The machine arrangement of claim 1, wherein the modular base includes openings configured to receive fork lift prongs.

10. The machine arrangement of claim 1, wherein each machine includes a shaft with a rotation device capable of being manually turned to rotate the turret and transfer star wheel.

11. The machine arrangement of claim 1, wherein articles in the machine arrangement follow a staggered, nonlinear path.

12. A machine arrangement which operates on a plurality of articles comprises:
    a plurality of machines arranged to cooperate with each other in a manner to form a machine arrangement,
    each machine in the plurality of machines includes a modular base, a transfer star wheel, and a turret mechanism configured to perform a working operation on an article, the turret mechanism including a turret star wheel, each machine in the plurality of machines being configured to receive a drive motor and reducer,
    wherein a central axis of the transfer star wheel is 45 degrees below horizontal relative to a central axis of the turret star wheel, and
    wherein at least one of the machines in the plurality of machines further includes a drive motor and reducer, the at least one machine in the plurality of machines driving the remaining ones of the plurality of machines.

13. The machine arrangement of claim 12, wherein the modular base of each machine in the plurality of machines has the same configuration as the modular base of all other machines in the plurality of machines.

14. The machine arrangement of claim 12, wherein the turret mechanism includes a 270 degree working angle, such that articles placed in the turret star wheel undergo a working operation along 270 degrees around the central axis of the turret star wheel.

15. The machine arrangement of claim 12, wherein the plurality of articles in the turret star wheel moves continuously in a machine processing direction.

16. The machine arrangement of claim 12, wherein each turret mechanism of each of the machines includes two cams, and wherein the turret mechanism includes a ram assembly with cam followers and tooling configured to follow the two cams and move the tooling toward and away from an article of the plurality of articles that is positioned in a corresponding pocket in the turret star wheel.

17. The machine arrangement of claim 12, wherein the modular base includes openings configured to receive fork lift prongs.

18. The machine arrangement of claim 12, wherein each machine includes a shaft with a rotation device capable of being manually turned to rotate the turret and transfer star wheel.

\* \* \* \* \*